(12) United States Patent
Srinivasan et al.

(10) Patent No.: US 8,625,680 B2
(45) Date of Patent: Jan. 7, 2014

(54) BITSTREAM-CONTROLLED POST-PROCESSING FILTERING

(75) Inventors: Sridhar Srinivasan, Seattle, WA (US); Chih-Lung Lin, Redmond, WA (US); Pohsiang Hsu, Redmond, WA (US); Thomas W. Holcomb, Bothell, WA (US); Ming-Chieh Lee, Bellevue, WA (US); Jordi Ribas-Corbera, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 584 days.

(21) Appl. No.: 10/680,072

(22) Filed: Oct. 6, 2003

(65) Prior Publication Data

US 2005/0053288 A1 Mar. 10, 2005

Related U.S. Application Data (60) Provisional application No. 60/501,081, filed on Sep. 7, 2003.

(51) Int. Cl.
*H04N 7/12* (2006.01)
*H04N 11/02* (2006.01)
*H04N 11/04* (2006.01)

(52) U.S. Cl.
USPC .................. 375/240.27; 375/240.29

(58) Field of Classification Search
USPC .......................... 375/240.29, 240.27
See application file for complete search history.

(56) References Cited

U.S. PATENT DOCUMENTS

| | | | |
|---|---|---|---|
| 5,684,602 A * | 11/1997 | Tsuchiya et al. | 358/404 |
| 5,787,203 A | 7/1998 | Lee et al. | |
| 5,799,113 A | 8/1998 | Lee | |
| 5,970,173 A | 10/1999 | Lee et al. | |
| 6,125,147 A * | 9/2000 | Florencio et al. | 375/240.29 |
| 6,249,610 B1 | 6/2001 | Matsumoto et al. | |
| 6,281,942 B1 | 8/2001 | Wang | |
| 6,324,301 B1 | 11/2001 | Jacquin et al. | |

(Continued)

FOREIGN PATENT DOCUMENTS

| | | |
|---|---|---|
| EP | 966841 | 12/1999 |
| EP | 1845729 | 10/2007 |

(Continued)

OTHER PUBLICATIONS

Kotropoulos et al., "Adaptive LMS L-filters for Noise Suppression in Images," *IEEE Transactions on Image Processing*, vol. 5, No. 12, pp. 1596-1609 (1996). [48 pp. as' downloaded from the World Wide Web on Apr. 30, 2001.].

(Continued)

*Primary Examiner* — Chikaodili E Anyikire
(74) *Attorney, Agent, or Firm* — Klarquist Sparkman, LLP (57) ABSTRACT

Techniques and tools for bitstream-controlled filtering are described. For example, a video encoder puts control information into a bitstream for encoded video. A video decoder decodes the encoded video and, according to the control information, performs post-processing filtering on the decoded video with a de-ringing and/or de-blocking filter. Typically, a content author specifies the control information to the encoder. The control information itself is post-processing filter levels, filter selections, and/or some other type of information. In the bitstream, the control information is specified for a sequence, scene, frame, region within a frame, or at some other syntax level.

39 Claims, 4 Drawing Sheets

Software 280 implementing bitstream-controlled filtering techniques for an encoder and/or decoder

(56) References Cited

U.S. PATENT DOCUMENTS

| | | | |
|---|---|---|---|
| 6,332,043 B1* | 12/2001 | Ogata | 382/240 |
| 6,366,617 B1* | 4/2002 | Ryan | 375/240.25 |
| 6,380,985 B1 | 4/2002 | Callahan | |
| 6,389,071 B1 | 5/2002 | Wilson | |
| 6,466,624 B1 | 10/2002 | Fogg | |
| 6,473,409 B1 | 10/2002 | Malvar | |
| 6,665,346 B1* | 12/2003 | Lee et al. | 375/240.29 |
| 6,941,263 B2 | 9/2005 | Wang et al. | |
| 7,126,989 B2* | 10/2006 | Hagai et al. | 375/240.13 |
| 2001/0017944 A1* | 8/2001 | Kalevo et al. | 382/268 |
| 2002/0136303 A1* | 9/2002 | Sun et al. | 375/240.16 |
| 2002/0186890 A1 | 12/2002 | Lee et al. | |
| 2003/0053541 A1* | 3/2003 | Sun et al. | 375/240.16 |
| 2003/0053708 A1* | 3/2003 | Kryukov et al. | 382/261 |
| 2003/0053711 A1* | 3/2003 | Kim | 382/268 |
| 2003/0152146 A1 | 8/2003 | Lin et al. | |
| 2003/0219074 A1* | 11/2003 | Park et al. | 375/240.29 |
| 2003/0235248 A1* | 12/2003 | Kim et al. | 375/240.12 |
| 2003/0235250 A1 | 12/2003 | Varma et al. | |
| 2004/0032908 A1* | 2/2004 | Hagai et al. | 375/240.25 |
| 2004/0228327 A1 | 11/2004 | Punjabi et al. | |
| 2004/0228415 A1* | 11/2004 | Wang | 375/240.29 |
| 2004/0247034 A1* | 12/2004 | Zhong et al. | 375/240.29 |
| 2005/0065780 A1 | 3/2005 | Wiser et al. | |
| 2006/0188017 A1* | 8/2006 | Hagai et al. | 375/240.15 |

FOREIGN PATENT DOCUMENTS

| | | |
|---|---|---|
| GB | 2365647 | 2/2002 |
| JP | 05-122681 | 5/1993 |
| JP | 07-231449 | 8/1995 |
| JP | 09-023422 | 1/1997 |
| JP | 11-122624 | 4/1999 |
| JP | 2002-232881 | 8/2002 |
| JP | 07-231449 | 8/2005 |

OTHER PUBLICATIONS

Webb, "Postprocessing to Reduce Blocking Artifacts for Low Bit-rate Video Coding Using Chrominance Information," *Proc. ICIP*, vol. 2, pp. 9-12 (1996).

Linares et al., "JPEG Estimated Spectrum Adaptive Postfiltering Using Image-Adaptive Q-Tables and Canny Edge Detectors," *Proc. ISCAS'96*, Atlanta GA, May 1996.

Lee et al., "Blocking Effect Reduction of JPEG Images by Signal Adaptive Filtering," *IEEE Trans. on Image Processing*, vol. 7, pp. 229-234, Feb. 1998.

Meier et al., "Reduction of Blocking Artifacts in Image and Video Coding," *IEEE Trans. on Circuits and Systems for Video Technology*, vol. 9, No. 3, pp. 490-500, Apr. 1999.

Chen et al., "Adaptive post-filtering of transform coefficients for the reduction of blocking artifacts," *IEEE Transactions on Circuits and Systems for Video Technology*, vol. 11, No. 5, pp. 594-602, 2001.

Choy et al., "Reduction of coding artifacts in transform image coding by using local statistics of transform coefficients," *IEEE International Symposium on Circuits and Systems*, pp. 1089-1092, 1997.

Minami et al., "An optimization approach for removing blocking effects in transform coding," *IEEE Transactions on Circuits and Systems for Video Technology*, vol. 5, No. 2, pp. 74-82, 1995.

Zhang et al., "A new approach to reduce the "blocking effect" of transform coding," *IEEE Transactions on Communications*, vol. 41, No. 2, pp. 299-302, 1993.

Malvar, "Biorthogonal and Nonuniform Lapped Transforms for Transform Coding with Reduced Blocking and Ringing Artifacts," *IEEE Transactions on Signal Processing*, vol. 46, No. 4, pp. 1043-1053, Apr. 1998.

Malvar, "A pre- and post-filtering technique for the reduction of blocking effects," in *Proc. Picture Coding Symp.*, Stockholm, Sweden, Jun. 1987.

Panis, "A method for reducing block artifacts by interpolating block borders," available at http://www.cs.mcgill.ca/~gstamm/Siemensl/paper1.html.

Panis et al., "Reduction of block artifacts by selective removal and reconstruction of the block borders," Picture Coding Symposium 97, Berlin, Sep. 10-12, 1997.

Wu et al., "Joint estimation of forward and backward motion vectors for interpolative prediction of video," *IEEE Transactions on Image Processing* 3(5):684-687, Sep. 1994.

Printouts of FTP directories from http://ftp3.itu.ch , 8 pp. (downloaded from the World Wide Web on Sep. 20, 2005.).

Park et al., "A post processing method for reducing quantization effects in low bit-rate moving picture coding," *IEEE Trans. Circuits Syst.*, Video Technol., vol. 9, pp. 161-171, Feb. 1999.

Apostolopoulos et al., "Post-processing for very-low-bit-rate video compression," *IEEE Trans. Image Processing*, vol. 8, pp. 1125-1129, Aug. 1999.

Lee et al., "Loop filtering and post-filtering for low-bit-rates moving picture coding," *Signal Processing: Image Communication 16*, pp. 871-890 (2001).

Sun et al., "Loop Filter with Skip Mode," Study Group 16, Video Coding Experts Group, 8 pp. (2001).

Cliff Reader, "History of MPEG Video Compression—Ver. 4.0," 99 pp., document marked Dec. 16, 2003.

Segall et al., "Pre- and Post-Processing Algorithms for Compressed Video Enhancement," Proc. 34$^{th}$ Asilomar Conf. on Signals and Systems (2000).

"Windows Media Video V8 Decoding Specification, Section 3 Syntax and Semantics, Section 4.2.7 Loop Filtering, Section 4.4 Loop Filtering, Annex A Processing for Coding Noise Reduction," 27 pp. (2003).

U.S. Appl. No. 10/623,128, filed Jul. 18, 2003.

"Windows Media Video V9 Decoding Specification, revision 87, Section 3 Syntax and Semantics, Section 4.9 In-loop Deblock Filtering, Annex A Processing for Coding Noise Reduction," 57 pp. (2003).

Study Group 16, Video Coding Experts Group "Report of the Ad Hoc Committee on Test Model Enhancement and Software Development," 2 pp. (1997).

Study Group 16, Video Coding Experts Group, "Post processing with special emphasis on block edges in case Annex J is not used," 2 pp. (1997).

Study Group 16, Video Coding Experts Group, "Addition of 'comfort noise as post processing," 2 pp. (1997).

Various, excerpts of reference software and documentation for H.26L JM, including "Encoding Types and the Related Variables in H.26L TML Software," "Unified Coding Style for the H.26L Reference Software," "global.h," "ldecod.c," "output.c," "b_frame.c," "image. c" (2001-2002).

ISO/IEC, ISO/IEC 11172-2, Information technology—Coding of moving pictures and associated audio for digital storage media at up to about 1,5 Mbit/s—Part 2: Video, 112 pp. (1993).

Ebrahimi, "MPEG-4 Video Verification Model: A video encoding/decoding algorithm based on content representation," 30 pp. (1997).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at p. x64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Joint Video Team (JVT) of ISO/IEC MPEG & ITU-T VCEG, "Draft ITU-T Recommendation and Final Draft International Standard of Joint Video Specification (ITU-T Rec. H.264 |ISO/IEC 14496-10 AVC," 253 pp. (May 2003).

Kuo et al., "Adaptive Postprocessor for Block Encoded Images," IEEE Trans. on Circuits and Systems for Video Technology, vol. 5, No. 4 (Aug. 1995).

O'Rourke et al., "Improved Image Decompression for Reduced Transform Coding Artifacts," IEEE Trans. on Circuits and Systems for Video Technology, vol. 5, No. 6, (Dec. 1995).

Wiegand et al., "Overview of the 11.264/AVC Video Coding Standard," IEEE Transactions on Circuits and Systems for Video Technology, vol. 13, No. 7, Jul. 2003, 19 pp.

(56) References Cited

OTHER PUBLICATIONS

Partial Search Report from European Patent Application No. 04 01 975.3, dated Apr. 5, 2005, 5 pages.
Examiner's Grounds for Rejection from Korean Patent Application No. 10-2004-71449, dated Mar. 17, 2006, 7 pages.
Notice on Office Action from Chinese Patent Application No. 200410077189.0, dated Jul. 7, 2006, 8 pages.
Examination Report from European Patent Application No. 04 019 753.5, dated Sep. 27, 2006, 5 pages.
Notice of Rejection from Japanese Patent Application No. 2004-260264, dated Oct. 3, 2006, 4 pages.
Examiner's Grounds for Rejection from Korean Patent Application No. 10-2004-71449, dated Dec. 29, 2006, 3 pages.
Notice of Final Rejection from Japanese Patent Application No. 2004-260264, dated Aug. 24, 2007, 9 pages.
Second Office Action from Chinese Patent Application No. 200410077189.0, dated Mar. 6, 2009, 8 pages.
Notice on Grant of Patent Right for Invention from Chinese Patent Application No. 200410077189.0, dated Aug. 28, 2009, 4 pp.
Appeal Decision from Japanese Patent Application No. 2004-260264, dated Nov. 12, 2010, 4 pages.
Interrogation from Japanese Patent Application No. 2004-260264, dated Jan. 8, 2010, 7 pages.
Notice of Grant from Korean Patent Application No. 10-2004-71449, dated Nov. 7, 2007, 3 pages.
Official Notice of Patent Registration from Japanese Patent Application No. 2004-260264, dated Nov. 26, 2010, 2 pages.
Examination Report dated Apr. 30, 2013, from European Patent Application No. 04019753.5, 4 pp.

* cited by examiner

Software 280 implementing bitstream-controlled filtering techniques for an encoder and/or decoder

BITSTREAM-CONTROLLED POST-PROCESSING FILTERING

CROSS REFERENCE TO RELATED APPLICATION

This application claims the benefit of U.S. Provisional Patent Application Ser. No. 60/501,081, entitled "VIDEO ENCODING AND DECODING TOOLS AND TECHNIQUES," filed Sep. 7, 2003, the disclosure of which is incorporated herein by reference.

TECHNICAL FIELD

Techniques and tools for bitstream-controlled filtering are described. For example, a video encoder provides control information for post-processing filtering, and a video decoder performs bitstream-controlled post-processing filtering with a de-ringing and/or de-blocking filter.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bitrate, of a typical raw digital video sequence can be 5 million bits/second or more.

Most computers and computer networks lack the resources to process raw digital video. For this reason, engineers use compression (also called coding or encoding) to reduce the bitrate of digital video. Compression can be lossless, in which quality of the video does not suffer but decreases in bitrate are limited by the complexity of the video. Or, compression can be lossy, in which quality of the video suffers but decreases in bitrate are more dramatic. Decompression reverses compression.

In general, video compression techniques include intraframe compression and interframe compression. Intraframe compression techniques compress individual frames, typically called I-frames or key frames. Interframe compression techniques compress frames with reference to preceding and/or following frames, which are typically called predicted frames, P-frames, or B-frames.

Microsoft Corporation's Windows Media Video Versions 8 ["WMV8"] and 9 ["WMV9"] each include a video encoder and a video decoder. The encoders use intraframe and interframe compression, and the decoders use intraframe and interframe decompression. There are also several international standards for video compression and decompression, including the Motion Picture Experts Group ["MPEG"] 1, 2, and 4 standards and the H.26x standards. Like WMV8 and WMV9, these standards use a combination of intraframe and interframe compression and decompression.

I. Block-Based Intraframe Compression and Decompression

Many prior art encoders use block-based intraframe compression. To illustrate, suppose an encoder splits a video frame into 8×8 blocks of pixels and applies an 8×8 Discrete Cosine Transform ["DCT"] to individual blocks. The DCT converts a given 8×8 block of pixels (spatial information) into an 8×8 block of DCT coefficients (frequency information). The DCT operation itself is lossless or nearly lossless. The encoder quantizes the DCT coefficients, resulting in an 8×8 block of quantized DCT coefficients. Quantization is lossy, resulting in loss of precision, if not complete loss of the information for the coefficients. The encoder then prepares the 8×8 block of quantized DCT coefficients for entropy encoding and performs the entropy encoding, which is a form of lossless compression.

A corresponding decoder performs a corresponding decoding process. For a given block, the decoder performs entropy decoding, inverse quantization, an inverse DCT, etc., resulting in a reconstructed block. Due to the quantization, the reconstructed block is not identical to the original block. In fact, there may be perceptible errors within reconstructed blocks or at the boundaries between reconstructed blocks.

II. Block-Based Interframe Compression and Decompression

Many prior art encoders use block-based motion-compensated prediction coding followed by transform coding of residuals. To illustrate, suppose an encoder splits a predicted frame into 8×8 blocks of pixels. Groups of four 8×8 luminance blocks and two co-located 8×8 chrominance blocks form macroblocks. Motion estimation approximates the motion of the macroblock relative to a reference frame, for example, a previously coded, preceding frame. The encoder computes a motion vector for the macroblock. In motion compensation, the motion vector is used to compute a prediction macroblock for the macroblock using information from the reference frame. The prediction is rarely perfect, so the encoder usually encodes blocks of pixel differences (also called the error or residual blocks) between the prediction and the original macroblock. The encoder applies a DCT to the error blocks, resulting in blocks of coefficients. The encoder quantizes the DCT coefficients, prepares the blocks of quantized DCT coefficients for entropy encoding, and performs the entropy encoding.

A corresponding decoder performs a corresponding decoding process. The decoder performs entropy decoding, inverse quantization, an inverse DCT, etc., resulting in reconstructed error blocks. In a separate motion compensation path, the decoder computes a prediction using motion vector information relative to a reference frame. The decoder combines the prediction with the reconstructed error blocks. Again, the reconstructed video is not identical to the corresponding original, and there may be perceptible errors within reconstructed blocks or at the boundaries between reconstructed blocks.

III. Blocking Artifacts and Ringing Artifacts

Lossy compression can result in noticeable errors in video after reconstruction. The heavier the lossy compression and the higher the quality of the original video, the more likely it is for perceptible errors to be introduced in the reconstructed video. Two common kinds of errors are blocking artifacts and ringing artifacts.

Block-based compression techniques have benefits such as ease of implementation, but introduce blocking artifacts, which are perhaps the most common and annoying type of distortion in digital video today. Blocking artifacts are visible discontinuities around the edges of blocks in reconstructed video. Quantization and truncation (e.g., of transform coefficients from a block-based transform) cause blocking artifacts, especially when the compression ratio is high. When blocks are quantized independently, for example, one block may be quantized less or more than an adjacent block. Upon reconstruction, this can result in blocking artifacts at the boundary between the two blocks. Or, blocking artifacts may result when high-frequency coefficients are quantized, if the overall content of the blocks differs and the high-frequency coefficients are necessary to reconstruct transition detail across block boundaries.

Ringing artifacts are caused by quantization or truncation of high-frequency transform coefficients, whether the transform coefficients are from a block-based transform or from a wavelet-based transform. Both such transforms essentially represent an area of pixels as a sum of regular waveforms, where the waveform coefficients are quantized, encoded, etc. In some cases, the contributions of high-frequency waveforms counter distortion introduced by a low-frequency waveform. If the high-frequency coefficients are heavily quantized, the distortion may become visible as a wave-like oscillation at the low frequency. For example, suppose an image area includes sharp edges or contours, and high-frequency coefficients are heavily quantized. In a reconstructed image, the quantization may cause ripples or oscillations around the sharp edges or contours.

IV. Post-Processing Filtering

Blocking artifacts and ringing artifacts can be reduced using de-blocking and de-ringing techniques. These techniques are generally referred to as post-processing techniques, since they are typically applied after video has been decoded. Post-processing usually enhances the perceived quality of reconstructed video.

The WMV8 and WMV9 decoders use specialized filters to reduce blocking and ringing artifacts during post-processing. For additional information, see Annex A of U.S. Provisional Patent Application Ser. No. 60/341,674, filed Dec. 17, 2001 and Annex A of U.S. Provisional Patent Application Ser. No. 60/488,710, filed Jul. 18, 2003. Similarly, software implementing several of the MPEG and H.26x standards mentioned above has de-blocking and/or de-ringing filters. For example, see (1) the MPEG-4 de-blocking and de-ringing filters as tested in the verification model and described in Annex F, Section 15.3 of MPEG-4 draft N2202, (2) the H.263+ post-processing filter as tested in the Test Model Near-term, and (3) the H.264 JM post-processing filter. In addition, numerous publications address post-processing filtering techniques (as well as corresponding pre-processing techniques, in some cases). For example, see (1) Kuo et al., "Adaptive Postprocessor for Block Encoded Images," IEEE Trans. on Circuits and Systems for Video Technology, Vol. 5, No. 4 (August 1995), (2) O'Rourke et al., "Improved Image Decompression for Reduced Transform Coding Artifacts," IEEE Trans. on Circuits and Systems for Video Technology, Vol. 5, No. 6, (1995), and (3) Segall et al., "Pre- and Post-Processing Algorithms for Compressed Video Enhancement," Proc. 34$^{th}$ Asilomar Conf. on Signals and Systems (2000).

Figure 1:
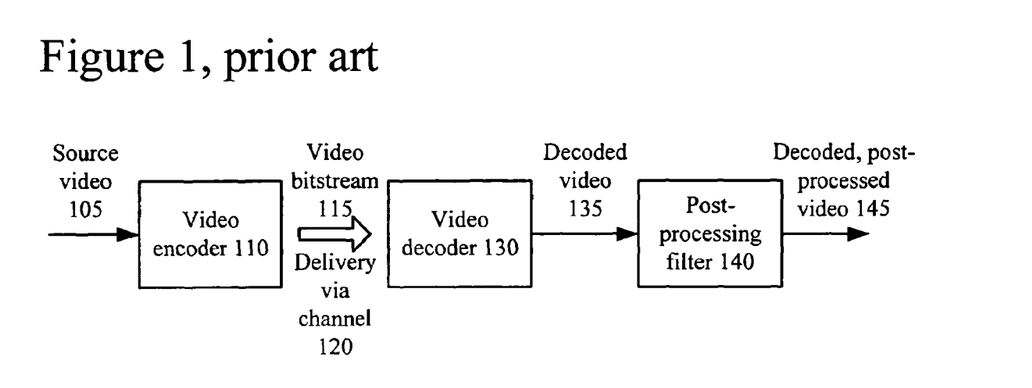
FIG. 1 is a diagram showing post-processing filtering according to the prior art.

FIG. 1 is a generalized diagram of post-processing filtering according to the prior art. A video encoder (110) accepts source video (105), encodes it, and produces a video bitstream (115). The video bitstream (115) is delivered via a channel (120), for example, by transmission as streaming media over a network. A video decoder (130) receives and decodes the video bitstream (115), producing decoded video (135). A post-processing filter (140) such as a de-ringing and/or de-blocking filter is used on the decoded video (135), producing decoded, post-processed video (145).

Strictly speaking, post-processing filtering techniques are not needed to decode the video bitstream (115). Codec (enCOder/DECoder) engineers may decide whether to apply such techniques when designing a codec. The decision can depend, for example, on whether CPU cycles are available for a software decoder, or on the additional cost for a hardware decoder. Since post-processing filtering techniques usually enhance video quality significantly, they are commonly applied in most video decoders today. Post-processing filters are sometimes designed independently from a video codec, so the same de-blocking and de-ringing filters may be applied to different codecs.

In prior systems, post-processing filtering is applied automatically to an entire video sequence. The assumption is that post-processing filtering will always at least improve video quality, and thus post-processing filtering should always be on. From system to system, filters may have different strengths according to the capabilities of the decoder. Moreover, some filters selectively disable or change the strength of filtering depending on decoder-side evaluation of the content of reconstructed video, but this adaptive processing is still automatically performed. There are several problems with these approaches.

First, the assumption that post-processing filtering always at least improves video quality is incorrect. For high quality video that is compressed without much loss, post-processing de-blocking and de-ringing may eliminate texture details and noticeably blur video images, actually decreasing quality. This sometimes occurs for high definition video encoded at high bitrates.

Second, there is no information in the video bitstream that guides post-processing filtering. The author is not allowed to control or adapt post-processing filtering by introducing information in the video bitstream to control the filtering.

V. In-Loop Filtering

Aside from post-processing filtering, several prior art systems use in-loop filtering. In-loop filtering involves filtering (e.g., de-blocking filtering) on reconstructed reference frames during motion compensation in the encoding and decoding processes (whereas post-processing is applied after the decoding process). By reducing artifacts in reference frames, the encoder and decoder improve the quality of motion-compensated prediction from the reference frames. For example, see (1) section 4.4 of U.S. Provisional Patent Application Ser. No. 60/341,674, filed Dec. 17, 2001, (2) section 4.9 of U.S. Provisional Patent Application Ser. No. 60/488,710, filed Jul. 18, 2003, (3) section 3.2.3 of the H.261 standard (which describes conditional low-pass filtering of macroblocks), (4) section 3.4.8 and Annex J of the H.263 standard, and (3) the relevant sections of the H.264 standard.

In particular, the H.264 standard allows an author to turn in-loop filtering on and off, and even modify the strength of the filtering, on a scene-by-scene basis. The H.264 standard does not, however, allow the author to adapt loop filtering for regions within a frame. Moreover, the H.264 standard applies only one kind of in-loop filter.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for bitstream-controlled filtering. For example, a video encoder puts control information into a bitstream for encoded video. A video decoder decodes the encoded video and, according to the control information, performs post-processing filtering on the decoded video. With this kind of control, a human operator can allow post-processing to the extent it enhances video quality and otherwise disable the post-processing. In one scenario, the operator controls post-processing filtering to prevent excessive blurring in reconstruction of high-definition, high bitrate video.

The various techniques and tools can be used in combination or independently.

In one aspect, a video encoder or other tool receives and encodes video data, and outputs the encoded video data as well as control information. The control information is for controlling post-processing filtering of the video data after decoding. The post-processing filtering includes de-blocking, de-ringing, and/or other kinds of filtering. Typically, a human operator specifies control information such as post-processing filter levels (i.e., filter strengths) or filter type selections. Depending on implementation, the control information is specified for a sequence, scene, frame, region within a frame, and/or at some other level.

In another aspect, a video decoder or other tool receives encoded video data and control information, decodes the encoded video data, and performs post-processing filtering on the decoded video data based at least in part upon the received control information. Again, the post-processing filtering includes de-blocking, de-ringing, and/or other kinds of filtering, and the control information is specified for a sequence, scene, frame, region within a frame, and/or at some other level, depending on implementation.

Additional features and advantages will be made apparent from the following detailed description of different embodiments that proceeds with reference to the accompanying drawings.

DETAILED DESCRIPTION

The present application relates to techniques and tools for bitstream-controlled post-processing filtering for de-blocking and de-ringing reconstructed video. The techniques and tools give a human operator control over post-processing filtering, such that the operator can enable post-processing to the extent it enhances video quality and otherwise disable the post-processing. For example, the operator controls post-processing filtering to prevent excessive blurring in reconstruction of high-definition, high bitrate video.

Among other things, the application relates to techniques and tools for specifying control information, parameterizing control information, signaling control information, and filtering according to control information. The various techniques and tools can be used in combination or independently. Different embodiments implement one or more of the described techniques and tools.

While much of the detailed description relates directly to de-blocking and de-ringing filtering during post-processing, the techniques and tools may also be applied at other stages (e.g., in-loop filtering in encoding and decoding) and for other kinds of filtering.

Similarly, while much of the detailed description relates to video encoders and decoders, another type of video processing tool or other tool may implement one or more of the techniques for bitstream-controlled filtering.

I. Computing Environment

Figure 2:
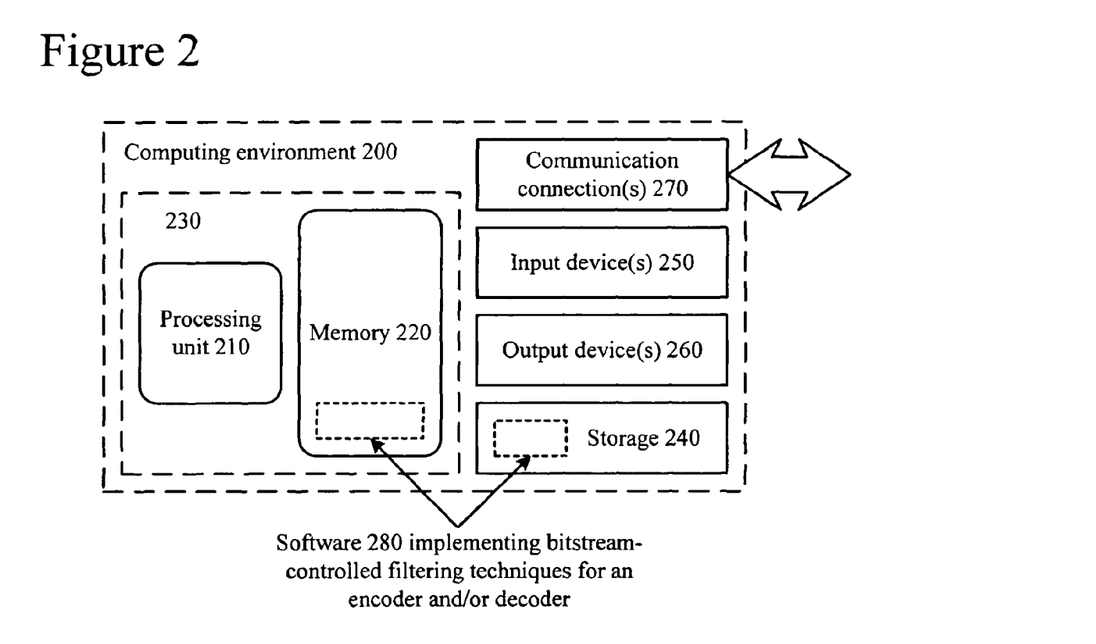
FIG. 2 is a block diagram of a suitable computing environment.

FIG. 2 illustrates a generalized example of a suitable computing environment (200) in which several of the described embodiments may be implemented. The computing environment (200) is not intended to suggest any limitation as to scope of use or functionality, as the techniques and tools may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing bitstream-controlled filtering techniques for an encoder and/or decoder.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, DVDs, or any other medium which can be used to store information and which can be accessed within the computing environment (200). The storage (240) stores the software (280) implementing the bitstream-controlled filtering techniques for an encoder and/or decoder.

The input device(s) (250) may be a touch input device such as a keyboard, mouse, pen, or trackball, a voice input device, a scanning device, or another device that provides input to the computing environment (200). For audio or video encoding, the input device(s) (250) may be a sound card, video card, TV tuner card, or similar device that accepts audio or video input in analog or digital form, or a CD-ROM or CD-RW that reads audio or video samples into the computing environment (200). The output device(s) (260) may be a display, printer, speaker, CD-writer, or another device that provides output from the computing environment (200).

The communication connection(s) (270) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, or other carrier.

The techniques and tools can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Generalized Video Encoder and Decoder

Figure 3:
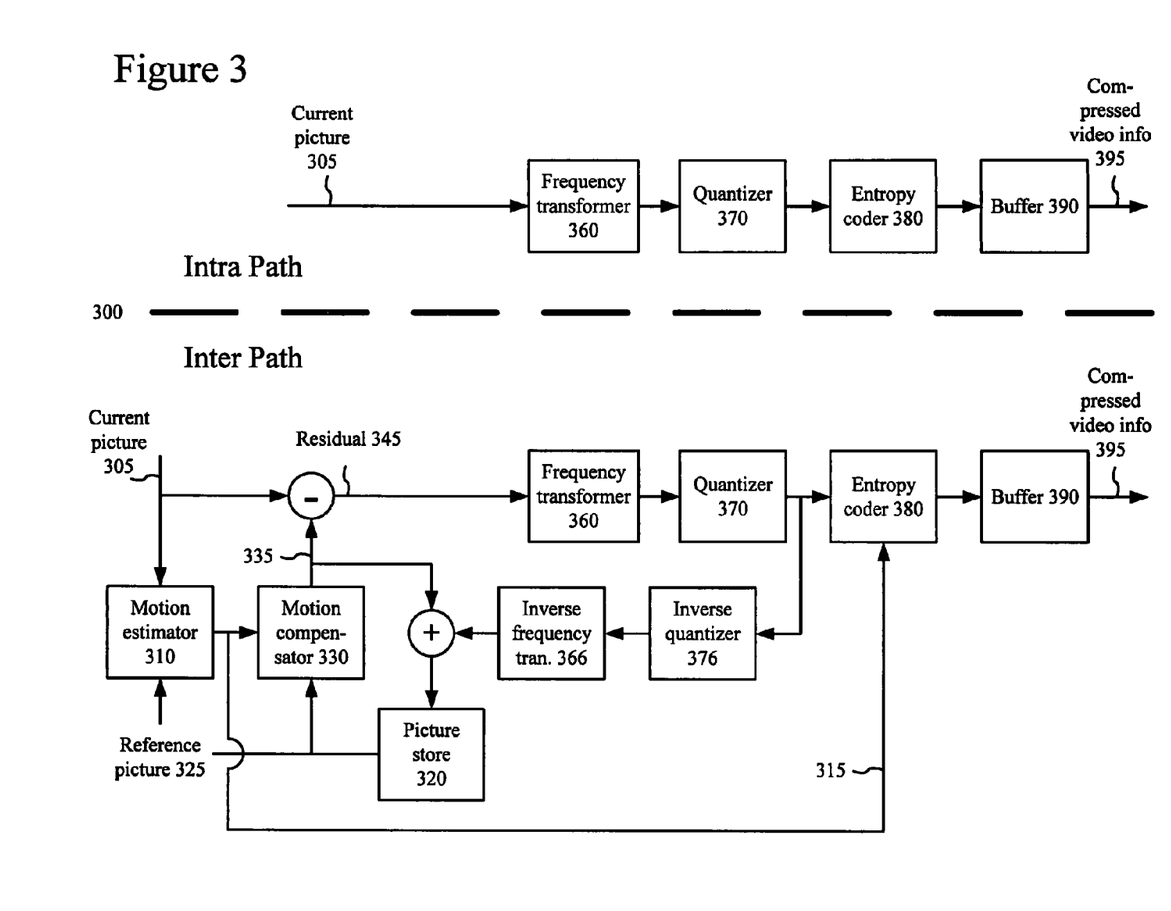
FIG. 3 is a block diagram of a generalized video encoder system.
Figure 4:
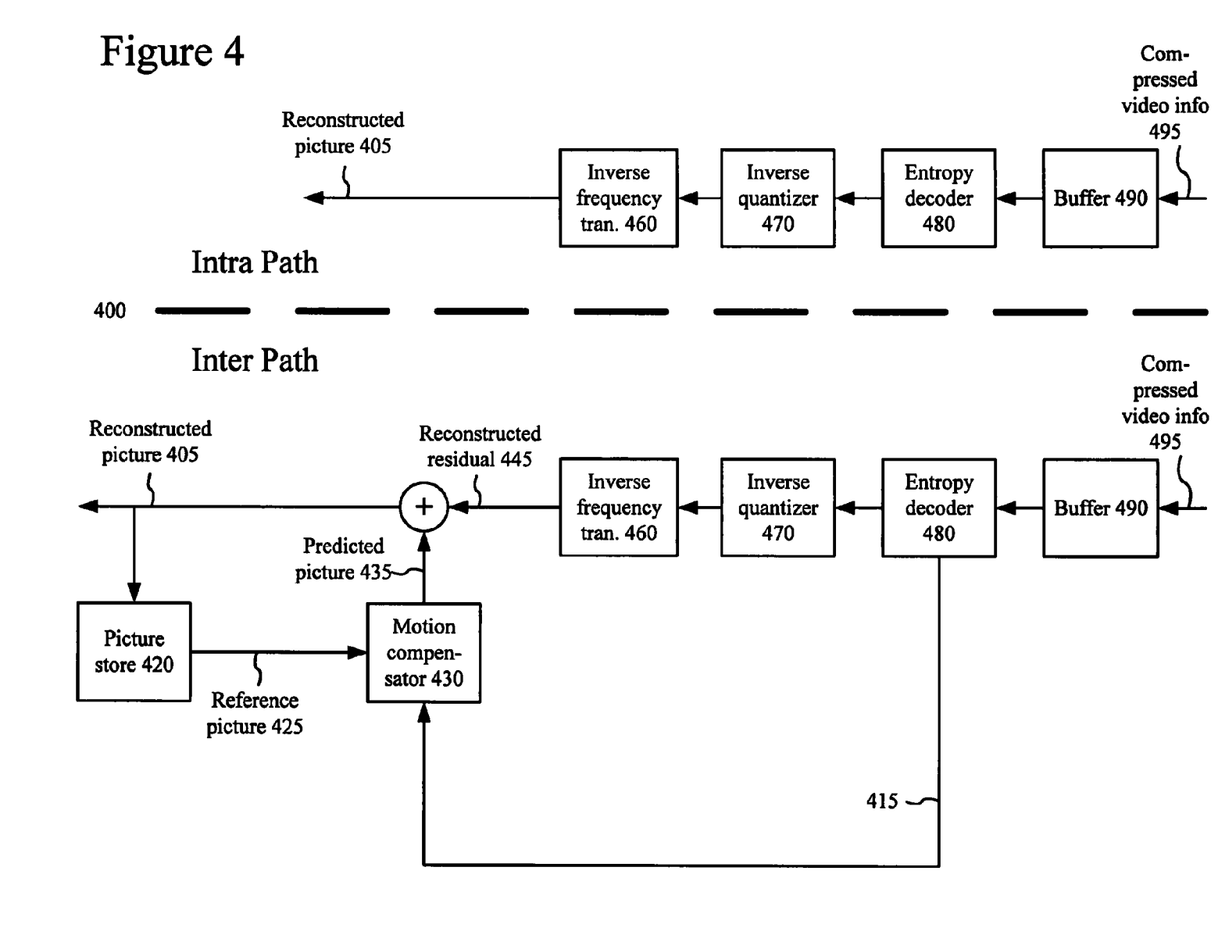
FIG. 4 is a block diagram of a generalized video decoder system.

FIG. 3 is a block diagram of a generalized video encoder (300) and FIG. 4 is a block diagram of a generalized video decoder (400).

The relationships shown between modules within the encoder and decoder indicate the main flow of information in the encoder and decoder; other relationships are not shown for the sake of simplicity. In particular, FIGS. 3 and 4 usually do not show side information indicating the encoder settings, modes, tables, etc. used for a video sequence, frame/field, macroblock, block, etc. Such side information is sent in the output bitstream, typically after entropy encoding of the side information. The format of the output bitstream can be Windows Media Video version 9 format or another format.

The encoder (300) and decoder (400) are block-based and use a 4:2:0 macroblock format with each macroblock including 4 luminance 8×8 luminance blocks (at times treated as one 16×16 macroblock) and two 8×8 chrominance blocks. The encoder (300) and decoder (400) operate on video pictures, which are video frames and/or video fields. Alternatively, the encoder (300) and decoder (400) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 3 is a block diagram of a general video encoder system (300). The encoder system (300) receives a sequence of video pictures including a current picture (305), and produces compressed video information (395) as output. Particular embodiments of video encoders typically use a variation or supplemented version of the generalized encoder (300).

The encoder system (300) compresses predicted pictures and key pictures. For the sake of presentation, FIG. 3 shows a path for key pictures through the encoder system (300) and a path for forward-predicted pictures. Many of the components of the encoder system (300) are used for compressing both key pictures and predicted pictures. The exact operations performed by those components can vary depending on the type of information being compressed.

A predicted picture (also called p-picture, b-picture for bi-directional prediction, or inter-coded picture) is represented in terms of prediction (or difference) from one or more other pictures. A prediction residual is the difference between what was predicted and the original picture. In contrast, a key picture (also called i-picture, intra-coded picture) is compressed without reference to other pictures.

If the current picture (305) is a forward-predicted picture, a motion estimator (310) estimates motion of macroblocks or other sets of pixels of the current picture (305) with respect to a reference picture (325), which is the reconstructed previous picture buffered in the picture store (320). In alternative embodiments, the reference picture is a later picture or the current picture is bi-directionally predicted. The motion estimator (310) outputs as side information motion information (315) such as motion vectors. A motion compensator (330) applies the motion information (315) to the reference picture (325) to form a motion-compensated current picture prediction (335). The prediction is rarely perfect, however, and the difference between the motion-compensated current picture prediction (335) and the original current picture (305) is the prediction residual (345). Alternatively, a motion estimator and motion compensator apply another type of motion estimation/compensation.

A frequency transformer (360) converts spatial domain video information into frequency domain (i.e., spectral) data. For block-based video pictures, the frequency transformer (360) applies DCT or variant of DCT to blocks of the pixel data or prediction residual data, producing blocks of DCT coefficients. Alternatively, the frequency transformer (360) applies another conventional frequency transform such as a Fourier transform or uses wavelet or subband analysis. In some embodiments, the frequency transformer (360) applies an 8×8, 8×4, 4×8, or other size frequency transform (e.g., DCT) to prediction residuals for predicted pictures.

A quantizer (370) then quantizes the blocks of spectral data coefficients. The quantizer applies uniform, scalar quantization to the spectral data with a step-size that varies on a picture-by-picture basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations.

When a reconstructed current picture is needed for subsequent motion estimation/compensation, an inverse quantizer (376) performs inverse quantization on the quantized spectral data coefficients. An inverse frequency transformer (366) then performs the inverse of the operations of the frequency transformer (360), producing a reconstructed prediction residual or reconstructed key picture data. If the current picture (305) was a key picture, the reconstructed key picture is taken as the reconstructed current picture (not shown). If the current picture (305) was a predicted picture, the reconstructed prediction residual is added to the motion-compensated current picture prediction (335) to form the reconstructed current picture. The picture store (320) buffers the reconstructed current picture for use in predicting the next picture. In some embodiments, the encoder (300) applies an in-loop de-blocking filter to the reconstructed picture to adaptively smooth discontinuities at block boundaries in the picture. For additional detail, see U.S. patent application Ser. No. 10/322,383, filed Dec. 17, 2002, and U.S. patent application Ser. No. 10/623,128, filed Jul. 18, 2003, the disclosures of which are hereby incorporated by reference.

The entropy coder (380) compresses the output of the quantizer (370) as well as certain side information. Typical entropy coding techniques include arithmetic coding, differential coding, Huffman coding, run length coding, LZ coding, dictionary coding, and combinations of the above. The entropy coder (380) typically uses different coding techniques for different kinds of information, and can choose from among multiple code tables within a particular coding technique.

The entropy coder (380) puts compressed video information (395) in the buffer (390). A buffer level indicator is fed back to bitrate adaptive modules. The compressed video information (395) is depleted from the buffer (390) at a constant or relatively constant bitrate and stored for subsequent streaming at that bitrate. Or, the encoder system (300) streams compressed video information at a variable rate.

Before or after the buffer (390), the compressed video information (395) can be channel coded for transmission over a network. The channel coding can apply error detection and correction data to the compressed video information (395).

In addition, the encoder (300) accepts control information for filtering operations. The control information may originate from a content author or other human operator, and may be provided to the encoder through an encoder setting or through programmatic control by an application. Or, the control information may originate from another source such as a module within the encoder (300) itself. The control information controls filtering operations such as post-processing de-blocking and/or de-ringing filtering, as described below. The encoder (300) outputs the control information at an appropriate syntax level in the compressed video information (395).

B. Video Decoder

FIG. 4 is a block diagram of a general video decoder system (400). The decoder system (400) receives information (495) for a compressed sequence of video pictures and produces output including a reconstructed picture (405). Particular embodiments of video decoders typically use a variation or supplemented version of the generalized decoder (400).

The decoder system (400) decompresses predicted pictures and key pictures. For the sake of presentation, FIG. 4 shows a path for key pictures through the decoder system (400) and a path for forward-predicted pictures. Many of the components of the decoder system (400) are used for decompressing both key pictures and predicted pictures. The exact operations performed by those components can vary depending on the type of information being decompressed.

A buffer (490) receives the information (495) for the compressed video sequence and makes the received information available to the entropy decoder (480). The buffer (490) typically receives the information at a rate that is fairly constant over time. Alternatively, the buffer (490) receives information at a varying rate. Before or after the buffer (490), the compressed video information can be channel decoded and processed for error detection and correction.

The entropy decoder (480) entropy decodes entropy-coded quantized data as well as entropy-coded side information, typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (480) frequently uses different decoding techniques for different kinds of information, and can choose from among multiple code tables within a particular decoding technique.

If the picture (405) to be reconstructed is a forward-predicted picture, a motion compensator (430) applies motion information (415) to a reference picture (425) to form a prediction (435) of the picture (405) being reconstructed. For example, the motion compensator (430) uses a macroblock motion vector to find a macroblock in the reference picture (425). A picture store (420) stores previous reconstructed pictures for use as reference pictures. Alternatively, a motion compensator applies another type of motion compensation. The prediction by the motion compensator (430) is rarely perfect, so the decoder (400) also reconstructs prediction residuals.

An inverse quantizer (470) inverse quantizes entropy-decoded data. In general, the inverse quantizer (470) applies uniform, scalar inverse quantization to the entropy-decoded data with a step-size that varies on a picture-by-picture basis or other basis. Alternatively, the inverse quantizer (470) applies another type of inverse quantization to the data, for example, a non-uniform, vector, or non-adaptive inverse quantization, or directly inverse quantizes spatial domain data in a decoder system that does not use inverse frequency transformations.

An inverse frequency transformer (460) converts quantized, frequency domain data into spatial domain video information. For block-based video pictures, the inverse frequency transformer (460) applies an inverse DCT ["IDCT"] or variant of IDCT to blocks of DCT coefficients, producing pixel data or prediction residual data for key pictures or predicted pictures, respectively. Alternatively, the inverse frequency transformer (460) applies another conventional inverse frequency transform such as an inverse Fourier transform or uses wavelet or subband synthesis. In some embodiments, the inverse frequency transformer (460) applies an 8×8, 8×4, 4×8, or other size inverse frequency transform (e.g., IDCT) to prediction residuals for predicted pictures.

When the decoder (400) needs a reconstructed picture for subsequent motion compensation, the picture store (420) buffers the reconstructed picture for use in the motion compensation. In some embodiments, the decoder (400) applies an in-loop de-blocking filter to the reconstructed picture to adaptively smooth discontinuities at block boundaries in the picture, for example, as described in U.S. patent application Ser. Nos. 10/322,383 and 10/623,128.

The decoder (400) performs post-processing filtering such as de-blocking and/or de-ringing filtering. For example, the decoder performs the post-processing filtering as in the WMV8 system, WMV9 system, or other system described above.

The decoder (400) receives (as part of the information (495)) control information for filtering operations. The control information affects operations such as post-processing de-blocking and/or de-ringing filtering, as described below. The decoder (400) receives the control information at an appropriate syntax level and passes the information to the appropriate filtering modules.

III. Bitstream-Controlled Post-Processing Filtering

In some embodiments, a video encoder allows a content author or other human operator to control the level of post-processing filtering for a particular sequence, scene, frame, or area within a frame. The operator specifies control information, which is put in the encoded bitstream. A decoder performs the post-processing filtering according to the control information. This lets the operator ensure that the post-processing enhances video quality when it is used, and that post-processing is disabled when it is not needed. For example, the operator controls post-processing filtering to prevent excessive blurring in reconstruction of high-definition, high bitrate video.

Figure 5:
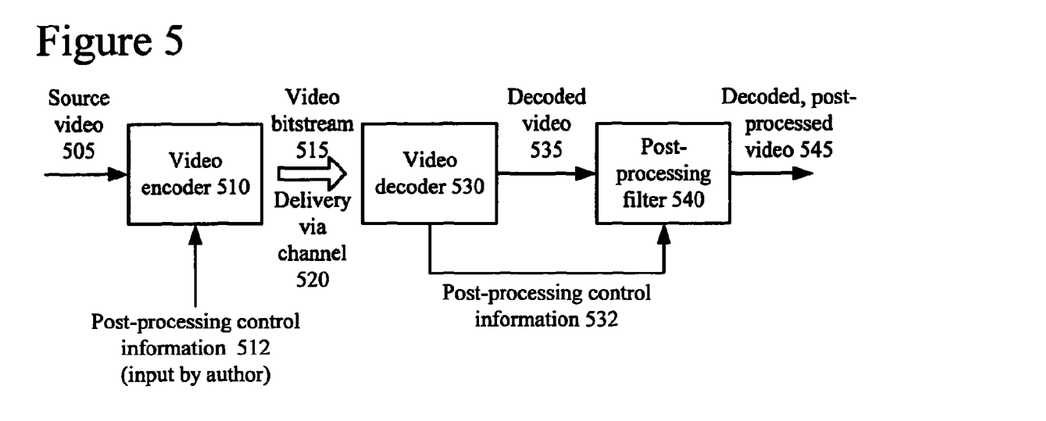
FIG. 5 is a diagram showing bitstream-controlled post-processing filtering.

FIG. 5 is a generalized diagram of a system (500) with bitstream-controlled post-processing filtering. The details of the components, inputs, and outputs shown in FIG. 5 vary depending on implementation.

A video encoder (510) accepts source video (505), encodes it, and produces a video bitstream (515). For example, the video encoder (510) is an encoder such as the encoder (300) shown in FIG. 3. Alternatively, the system (500) includes a different video encoder (510).

In addition to receiving the source video (505), the encoder (510) receives post-processing control information (512) that originates from input by a content author or other human operator. For example, the author provides the post-processing control information (512) directly to the encoder (510) or adjusts encoder settings for the post-processing filtering. Or, some other application receives input from the author, and that other application passes post-processing control information (512) to the encoder (510). Alternatively, instead of a human operator specifying the post-processing control information (512), the encoder (510) decides the control information (512) according to codec parameters or the results of video encoding. For example, the encoder (510) increases filter strength as the compression ratio applied increases (e.g., increasing filter strength for larger quantization step size, and vice versa; or, decreasing filter strength for greater encoded bits/pixels, and vice versa).

The encoder (510) puts the post-processing control information (512) in the video bitstream (515). The encoder (510) formats the post-processing control information (512) as fixed length codes (such as 00 for level 0, 01 for level 1, 10 for level 2, etc.). Or, the encoder (510) uses a VLC/Huffman table to assign codes (such as 0 for level 0, 10 for level 1, 110 for level 2, etc.), or uses some other type of entropy encoding. The encoder (510) puts the control information (512) in a header at the appropriate syntax level of the video bitstream (515). For example, control information (512) for a picture is put in a picture header for the picture. For an MPEG-2 or MPEG-4 bitstream, the location in the header could be the private data section in the picture header.

The video bitstream (515) is delivered via a channel (520), for example, by transmission as streaming media over a network. A video decoder (530) receives the video bitstream (515). The decoder (530) decodes the encoded video data, producing decoded video (535). The decoder (530) also retrieves the post-processing control information (532) (performing any necessary decoding) and passes the control information (532) to the post-processing filter (540).

The post-processing filter (540) uses the control information (532) to apply the indicated post-processing filtering to the decoded video (535), producing decoded, post-processed video (545). The post-processing filter (540) is, for example, a de-ringing and/or de-blocking filter.

Figure 6:
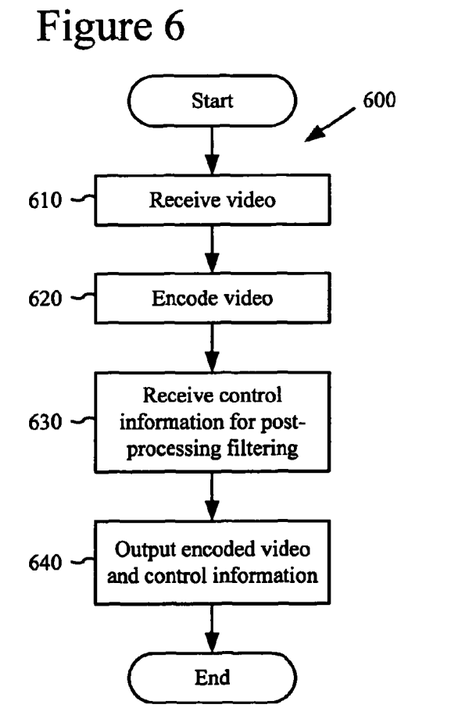
FIG. 6 is a flowchart showing a technique for producing a bitstream with embedded control information for post-processing filtering.

FIG. 6 shows a technique (600) for producing a bitstream with embedded control information for post-processing filtering. An encoder such as the encoder (300) shown in FIG. 3 performs the technique (600).

The encoder receives (610) video to be encoded and also receives (630) control information for post-processing filtering. The encoder encodes (620) the video and outputs (640) the encoded video and the control information. In one implementation, the encoder encodes (620) the video, decodes the video, and presents the results. The author then decides the appropriate post-processing strength, etc. for the control information. The decision-making process for post-processing strength and other control information may include actual post-processing in the encoder (following decoding of the encoded frame or other portion of the video), in which the encoder iterates through or otherwise evaluates different post-processing strengths, etc. until a decision is reached for the frame or other portion of the video.

The technique (600) shown in FIG. 6 may be repeated during encoding, for example, to embed control information on a scene-by-scene or frame-by-frame basis in the bitstream. More generally, depending on implementation, stages of the technique (600) can be added, split into multiple stages, combined with other stages, rearranged and/or replaced with like stages. In particular, the timing of the receipt (630) of the control information can vary depending on implementation.

Figure 7:
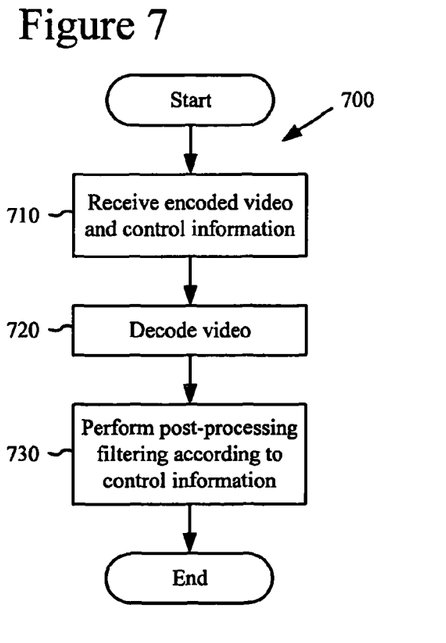
FIG. 7 is a flowchart showing a technique for performing bitstream-controlled post-processing filtering.

FIG. 7 shows a technique (700) for performing bitstream-controlled post-processing filtering. A decoder such as the decoder (400) shown in FIG. 4 performs the technique (700).

The decoder receives (710) encoded video and control information for post-processing filtering. The decoder decodes (720) the video. The decoder then performs (730) post-processing filtering according to the control information. The technique (700) shown in FIG. 7 may be repeated during decoding, for example, to retrieve and apply control information on a scene-by-scene or frame-by-frame basis. More generally, depending on implementation, stages of the technique (700) can be added, split into multiple stages, combined with other stages, rearranged and/or replaced with like stages.

A. Types of Post-Processing Control Information

There are several different possibilities for the content of the post-processing control information. The type of control information uses depends on implementation. The simplest type represents an ON/OFF decision for post-processing filtering.

Another type of control information indicates a post-processing level (i.e., strength) of de-blocking, de-ringing, and/or other filtering. Bitstream-controlled post-processing is particularly useful when the control information represents the maximum allowed post-processing level. For example, suppose a higher level indicates stronger filtering. If the author indicates post-processing level 3 for a given video frame, the decoder may apply post-processing of level 0, 1, 2, or 3 to the given frame, but not 4 or higher. This approach provides some flexibility. If a software decoder does not have enough CPU cycles available to apply level 3 for the frame, it may only apply level 2, etc. At the same time, using a maximum allowed level achieves the main goal—ensuring that the video will never be excessively blurred by post-processing. A smart author sets the maximum allowed level to 0 (i.e., no post-processing) or a low level when the decoded video is already of high quality, and sets a higher level when the decoded video presents more blocking and ringing artifacts.

Alternatively, instead of maximum allowed levels, the control information represents exact levels. Such control information specifies a mandatory level of post-processing filtering, which is useful when the author wants to control post-processing exactly. Or, the control information represents minimum allowed levels. This is useful when the author wants to guarantee that at least a minimum level of post-processing filtering is applied, for example, for very low bitrate video.

Still another type of control information represents filter type selections, instead of or in addition to filter level information for one particular filter or filters. For example, value 0 indicates no post-processing, value 1 indicates de-blocking, value 2 indicates de-ringing, value 3 indicates both de-blocking and de-ringing, etc.

The control information alternatively includes other and/or additional types of information.

B. Syntax Levels for Control Information

Depending on implementation, control information is specified for a sequence, on a scene-by-scene basis within a sequence, on a frame-by-frame basis, on a region-by-region basis, or on some other basis. This allows the author to review reconstructed video and adapt the post-processing for a given sequence, scene, frame, region within a frame, etc., depending on the syntax level(s) at which control is enabled. Similarly, the bitstream includes syntax elements for control information at the appropriate syntax level(s) for sequence, scene, frame, region within a frame, etc.

To specify control information for a region within a frame, the author may define an area such as a rectangle or ellipse, for example, and the parameters for the size and location of the area are put in the bitstream. For a rectangle, the area is definable by the sides (a, b) and top-left corner pixel location (x, y), coded using fixed length or variable length codes. The post-processing strength for the area is also put in the bitstream. Alternatively, another syntax is used to specify control information for different regions within a frame for post-processing filtering.

IV. Extensions

In one or more embodiments, an operator specifies control information for in-loop filtering for a sequence, on a scene-by-scene basis, on a frame-by-frame basis, on a region-by-region basis, or on some other basis. The control information includes levels (i.e., strengths) of filters, types of filters (e.g., to select from among multiple available filters), and/or other types of information.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computer system, a computer-implemented method comprising:
   receiving video data;
   encoding the video data, wherein the encoding includes in-loop deblock filtering, and wherein the encoded video data indicates modes to be used during decoding;
   parameterizing post-processing control information other than the encoded video data, including:
      setting a filter type selection that identifies one or more of plural different types of filters for post-processing filtering, wherein the post-processing control information other than the encoded video data includes the filter type selection; and
      setting filter information that varies depending on quality or bitrate of the encoded video data, wherein the post-processing control information other than the encoded video data further includes the filter information, and wherein the filter information is different than the filter type selection;
   wherein the post-processing control information facilitates adjustment by a decoder of the post-processing filtering of the video data after decoding of the encoded video data, the adjustment including:
      using the filter type selection to identify the one or more types of filters; and
      using the filter information to determine filter operations that are appropriate for the quality or bitrate of the encoded video data, wherein the filter operations are for the identified one or more types of filters, and wherein, within settings defined by the post-processing control information for the post-processing filtering, the decoder can adjust the filter operations depending on processing cycles available to the decoder; and
   outputting the encoded video data as well as the post-processing control information.

2. The method of claim 1 further comprising:
   receiving input that indicates the post-processing control information.

3. The method of claim 2 wherein a video encoder receives the input.

4. The method of claim 2 wherein an application receives the input and provides the post-processing control information to a video encoder.

5. The method of claim 1 wherein a video encoder specifies the post-processing control information depending on one or more criteria, and wherein the one or more criteria include quantization step size and/or quality of the video data.

6. The method of claim 1 wherein the post-processing filtering to be performed includes applying a de-blocking filter.

7. The method of claim 1 wherein the post-processing filtering to be performed includes applying a de-ringing filter.

8. The method of claim 1 wherein the filter information is parameterized as a level for the post-processing filtering.

9. The method of claim 1 wherein the filter information is parameterized as a maximum allowed level for the post-processing filtering.

10. The method of claim 1 wherein the filter information is parameterized as a minimum allowed level for the post-processing filtering.

11. The method of claim 1 further comprising entropy encoding the post-processing control information.

12. The method of claim 1 wherein the adjustment of post-processing filtering to be performed comprises skipping the post-processing filtering for at least some of the video data.

13. The method of claim 1 wherein the post-processing control information specifies that the decoder should skip the post-processing filtering.

14. The method of claim 1 wherein the post-processing control information further comprises:
   information indicating whether or not the post-processing filtering is to be performed after decoding; and
   for each of plural pictures represented in the video data, if the post-processing filtering is to be performed for the picture, information indicating the filter type selection for the post-processing filtering for the picture.

15. The method of claim 1 wherein, when the filter information indicates lower quality or bitrate, the filter information tends to enable the post-processing filtering, and wherein, when the filter information indicates higher quality or bitrate, the filter information tends to disable the post-processing filtering.

16. In a computing device that implements a video encoder, a method comprising:

at the computing device that implements the video encoder, receiving video data;

with the computing device that implements the video encoder, encoding the video data, wherein the encoding includes in-loop deblock filtering, and wherein the encoded video data indicates modes to be used during decoding;

with the computing device that implements the video encoder, parameterizing post-processing control information other than the encoded video data, including:

setting a filter type selection that identifies one or more of plural different types of filters for post-processing filtering, wherein the post-processing control information other than the encoded video data includes the filter type selection; and setting filter information that varies depending on quality or bitrate of the encoded video data, wherein the post-processing control information other than the encoded video data further includes the filter information, and wherein the filter information is different than the filter type selection;

wherein the post-processing control information facilitates adjustment by a decoder of the post-processing filtering of the video data after decoding, the adjustment including using the filter information to determine filter operations that are appropriate for the quality or bitrate of the encoded video data, wherein the filter operations are for the one or more types of filters identified with the filter type selection, wherein, within settings defined by the post-processing control information for the post-processing filtering, the decoder can adjust the filter operations depending on processing power available to the decoder, wherein, when the filter information indicates lower quality or bitrate, the filter information tends to enable the post-processing filtering, and wherein, when the filter information indicates higher quality or bitrate, the filter information tends to disable the post-processing filtering; and with the computing device that implements the video encoder, outputting the encoded video data as well as the post-processing control information.

17. The method of claim 16 wherein a video encoder specifies the post-processing control information depending on one or more criteria, and wherein the one or more criteria include quantization step size and/or quality of the video data.

18. The method of claim 16 wherein the post-processing filtering to be performed includes applying a de-blocking filter or a de-ringing filter.

19. The method of claim 16 wherein the filter information is parameterized as a level for the post-processing filtering.

20. The method of claim 16 wherein the filter information is parameterized as a maximum allowed level or a minimum allowed level for the post-processing filtering.

21. The method of claim 16 wherein the post-processing control information further comprises:

information indicating whether or not the post-processing filtering is to be performed after decoding; and for each of plural pictures represented in the video data, if the post-processing filtering is to be performed for the picture, information indicating the filter type selection for the post-processing filtering for the picture.

22. A computer-implemented method comprising:

receiving encoded video data in a bitstream as well as post-processing control information in the bitstream for controlling post-processing filtering, the encoded video data indicating modes to be used during decoding, and the post-processing control information comprising data in the bitstream other than the encoded video data, wherein the post-processing control information includes:

a filter type selection that identifies one or more of plural different types of filters for the post-processing filtering; and filter information that varies depending on quality or bitrate of the encoded video data, wherein the filter information is different than the filter type selection;

decoding the encoded video data, wherein the decoding includes in-loop deblock filtering;

determining available processing cycles; and adjusting the post-processing filtering on the decoded video data, the adjustment including using the filter information to determine filter operations that are appropriate for the quality or bitrate of the encoded video data, wherein the filter operations are for the one or more types of filters identified with the filter type selection, and wherein, within settings defined by the post-processing control information for the post-processing filtering, the decoder can adjust the filter operations depending on the processing cycles available to the decoder.

23. The method of claim 22 wherein the post-processing filtering includes applying a de-blocking filter.

24. The method of claim 22 wherein the post-processing filtering includes applying a de-ringing filter.

25. The method of claim 22 wherein the filter information is parameterized as a level for the post-processing filtering.

26. The method of claim 22 wherein the filter information is parameterized as a maximum allowed level for the post-processing filtering.

27. The method of claim 22 wherein the filter information is parameterized as a minimum allowed level for the post-processing filtering.

28. The method of claim 22 further comprising entropy decoding the post-processing control information.

29. The method of claim 22, wherein determining available processing cycles comprises determining available CPU cycles for applying post-processing filtering.

30. The method of claim 22, further comprising performing the post-processing filtering.

31. The method of claim 22, wherein the post-processing control information further comprises:

information indicating whether or not the post-processing filtering is to be performed after decoding; and for each of plural pictures represented in the video data, if the post-processing filtering is to be performed for the picture, information indicating the filter type selection for the post-processing filtering for the picture;

the method further comprising parsing the post-processing control information.

32. The method of claim 31, wherein the parsing the post-processing control information comprises parsing the information indicating whether or not post-processing filtering is to be performed.

33. The method of claim 32, wherein the parsing the post-processing control information further comprises, for each of the plural pictures represented in the video data, if the post-processing filtering is to be performed for the picture, parsing the information indicating the filter type selection for the post-processing filtering for the picture.

34. The method of claim 22 wherein, when the filter information indicates lower quality or bitrate, the filter information tends to enable the post-processing filtering, and wherein, when the filter information indicates higher quality or bitrate, the filter information tends to disable the post-processing filtering.

35. A computer-readable medium storing computer-executable instructions for causing a computer system to perform a computer-implemented method, the computer-readable medium including one or more of non-volatile memory, a magnetic storage medium and an optical storage medium, the method comprising:

receiving encoded video data in a bitstream as well as post-processing control information in the bitstream for controlling post-processing filtering, wherein the encoded video data indicates modes to be used during decoding, the post-processing control information comprising data in the bitstream other than the encoded video data, wherein the post-processing control information includes:

a filter type selection that identifies one or more of plural different types of filters for the post-processing filtering; and filter information that varies depending on quality or bitrate of the encoded video data, wherein the filter information is different than the filter type selection;

decoding the encoded video data, wherein the decoding includes in-loop deblock filtering;

using the filter type selection to select one or more of plural different types of filters for post-processing filtering;

determining available processing power; and adjusting the post-processing filtering on the decoded video data, including using the filter information to determine filter operations that are appropriate for the quality or bitrate of the encoded video data, wherein the filter operations are for the selected one or more types of filters, wherein, within settings defined by the post-processing control information for the post-processing filtering, the decoder can adjust the filter operations depending on the processing power available to the decoder, wherein, when the filter information indicates lower quality or bitrate, the filter information tends to enable the post-processing filtering, and wherein, when the filter information indicates higher quality or bitrate, the filter information tends to disable the post-processing filtering.

36. The computer-readable media of claim 35 wherein the post-processing filtering includes applying a de-blocking filter or a de-ringing filter.

37. The computer-readable media of claim 35 wherein the filter information is parameterized as a level for the post-processing filtering.

38. The computer-readable media of claim 35 wherein the filter information is parameterized as a maximum allowed level or a minimum allowed level for the post-processing filtering.

39. The computer-readable media of claim 35 wherein determining available processing power comprises determining available CPU cycles for applying post-processing filtering.

* * * * *